United States Patent [19]

Pickens

[11] Patent Number: 4,582,964
[45] Date of Patent: Apr. 15, 1986

[54] REMOTE LOOP-AROUND CARRIER TEST SYSTEM

[75] Inventor: Herman L. Pickens, Huntsville, Ala.

[73] Assignee: James A. Mayberry, Birmingham, Ala.

[21] Appl. No.: 624,415

[22] Filed: Jun. 25, 1984

[51] Int. Cl.[4] .............................................. H04B 3/46
[52] U.S. Cl. ..................... 179/175.3 R; 179/175.31 R
[58] Field of Search ................ 179/175.3 A, 175.3 R, 179/175.31 R; 370/15; 371/22

[56] References Cited

U.S. PATENT DOCUMENTS

| | | | |
|---|---|---|---|
| 3,371,165 | 2/1968 | Earle et al. | 179/175.3 |
| 3,943,305 | 3/1976 | Hagedorn | 371/22 X |
| 3,959,606 | 3/1976 | Merlet et al. | 179/175.31 R |
| 4,380,810 | 4/1983 | Canniff | 179/175.3 R X |

Primary Examiner—Stafford D. Schreyer
Attorney, Agent, or Firm—C. A. Phillips

[57] ABSTRACT

A testing system for testing a selected telephone carrier channel wherein that channel is selectively interrupted at a selected repeater station along its route and bi-directionally looped back for testing. Selection and the looping back process is controlled by a central control unit located at a central telephone exchange and remote control units located at repeater stations. Significantly, the central unit is operated by a dialed telephone call to it, and responsive to additionally dialed digits, it effects the selection of the particular route for the channel in question and a particular repeater station and channel. Actual looping back is effected by a transformer coupling arrangement which additionally provides for the D.C. integrity of the channel.

6 Claims, 3 Drawing Figures

REMOTE LOOP-AROUND CARRIER TEST SYSTEM

TECHNICAL FIELD

This invention relates generally to telephone line testing systems, and particularly to a system for selectively looping a portion of an outgoing communications cable with an incoming portion of a carrier-type communications link, thereby enabling testing of the line at one or both ends.

BACKGROUND ART

Long-distance telephone communications serving a local telephone exchange typically involves the employment of multichanneled communications links or routes extending in a number of directions. Each communications route typically employs a communications cable or cables made up of wire or conductor pairs and wherein two pairs, or four wires, are employed for each communications channel and wherein one pair would provide an outward communications for one channel, and the other providing inward communications to that channel. Because of attenuation of telephone signals along a cable, amplifiers are typically required at 1- to 6-mile intervals. These are referred to as repeater amplifiers, or just repeaters, and are housed at repeater stations. When a problem occurs on a particular channel, it is common practice to loop back from a repeater station, to a central office, the incoming and outgoing wire pairs of a communications channel, whereby there is formed a communications loop at the central office, which can thus can be tested at the central office. At present, this often involves a maintenance person having to go to a number of repeater stations along a route in order to isolate that portion of a communications channel which is at fault. Thus, obviously, it would be desirable to be able to remotely and selectively, within a matter of minutes, effect the looping back operation at all of the repeater stations along a route. While the applicant is aware that efforts have been made to do this, he is unaware of any successful efforts.

It is thus the object of this invention to provide a truly effective, remotely controllable, looping back system.

SUMMARY OF THE INVENTION

In accordance with this invention a central control unit, or COU, is placed at some type of communications center, for example, a telephone central office. The COU is remotely controllable, once communication with it is established, and this being by a single telephone call on an ordinary telephone line through a telephone exchange to the COU, which may or may not be housed at the same location. The COU includes a ring detector which affects the answering of a call on an input telephone line and a hold circuit which holds the telephone line connection during the looping back process. Once the hold condition occurs, this is sensed, and a dial tone generator generates a distinctive dial tone on the line, indicating to the caller, typically a test director, that there has, in fact, been made a control connection to the COU and that a looping back process may proceed. The first step requires that the caller indicate a route selection for the communications channel which is to be tested. This is done by the touch-tone dialing of an assigned route number. Touch-tone dialing impresses on a telephone line a tone or tones representative of a digit. When this is done, the COU effects a coupling of the telephone line to a selected dedicated control line or wire pair, extending along that route and coupling to each repeater on that route. This act of dialing is detected in the COU, and the COU originated dial tone is removed. The caller is thereby informed that he may next dial a number choosing a particular repeater station along the chosen route, and this number, when dialed, is transmitted as a tone encoded digit or digits along the dedicated pair to all repeater stations. Each repeater station is equipped with a remote loop-around unit, or RLU. It includes a tone detector which converts tones to binary encoded signals representative of digits and temporarily stores them in an input register. Each RLU also includes an address register in which its own digitally encoded address number is stored. It compares its address with the received one, and the RLU holding the correct address in register responds by placing on the line a new and distinctive dial tone, typically distinctive from the one generated by the COU. It also enables that RLU only to respond to a channel designation. The new dial tone signals to the caller that he has made contact with a desired repeater station RLU and that he may select the communications channel that he wishes to test by having it looped back from that repeater station. This selection is made by dialing a designated channel number which, in keeping with the typical number of the channels passing through a repeater station, would typically be in a range of a number 000 to 256. Upon receipt of the channel number dial signal, two events are effected. The dial tone is removed, signalling the reception, and the detected number is employed to operate a relay switching circuit which operates a discrete relay which interrupts the normal path of the two wire pairs of that communications channel through the repeater station and connects both sets of the interrupted ends together through transformers to effect the looping back operation in both directions.

DETAILED DESCRIPTION OF THE DRAWINGS

Figures 1, 1A:
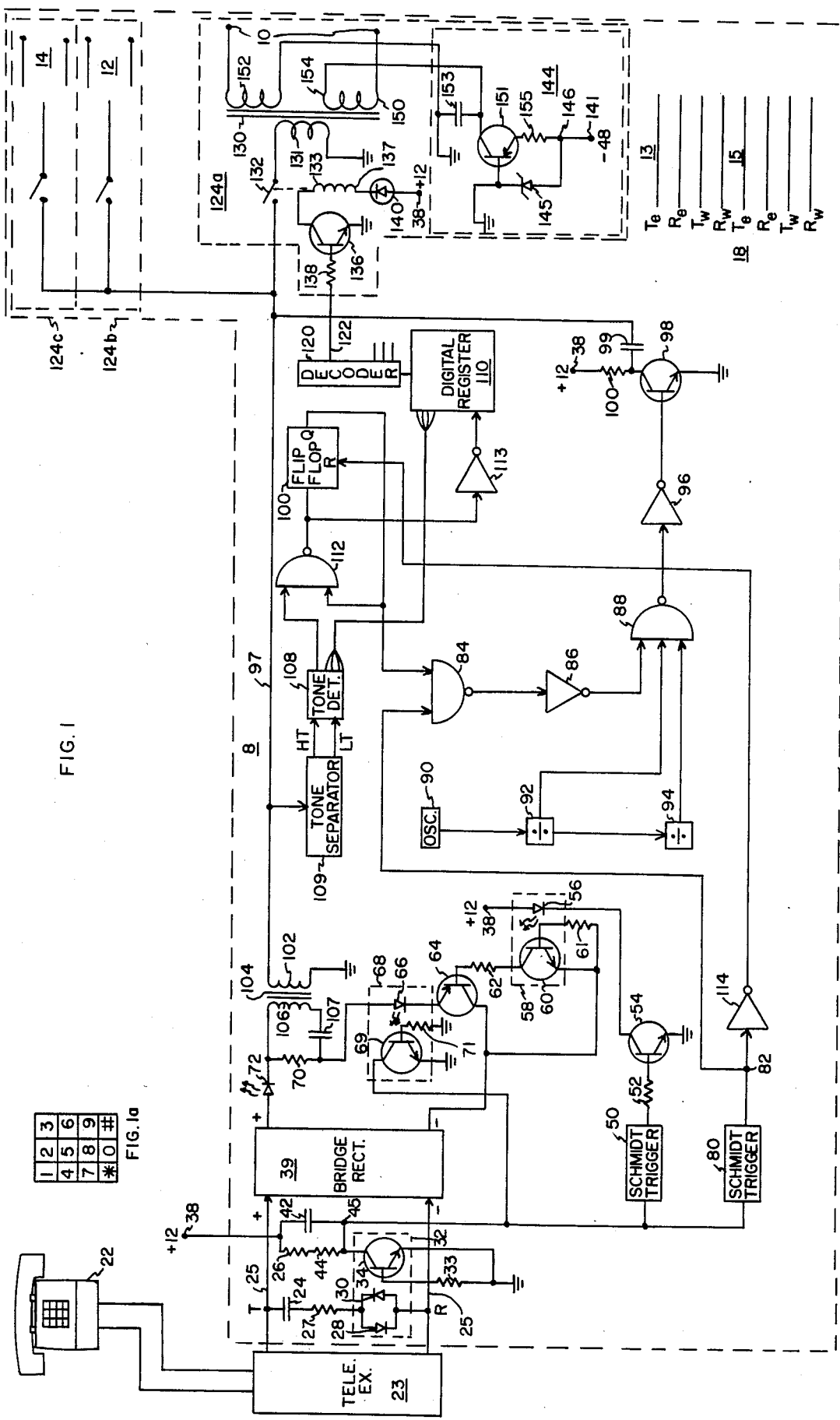
FIG. 1 is an electrical block diagram of the central office unit (COU) of applicant's system.
FIG. 1a illustrates the key pad of a standard touch-tone telephone.

Referring to FIG. 1, the input of central office unit (COU) 8 is coupled by a standard T and R, tip and ring, telephone line 25 to telephone exchange 23. Control of COU 8 is effected by any touch-tone telephone (the key pad of which is shown in FIG. 1a) connectible to telephone exchange 23, illustrated here as telephone 22. In general, COU 8 functions to connect telephone line 25 to any one of a plurality of dedicated control lines or wire pairs, these being illustrated by line pairs 10, 12, and 14, with each serving a discrete communications route. Each of the dedicated lines 10, 12, and 14 would connect to and pass through a number of RLUs of repeater stations along its route.

Additionally, FIG. 1 shows, as an illustration, two communications channels, labeled channels 13 and 15, which would extend along a particular route; and, in this case, they are shown to extend along route 10. They are illustrated as passing through at terminal points $T_E$, $R_E$, $T_W$, and $R_W$, illustrating that one wire pair labeled with channel numbers and E would handle an eastbound transmission of a conversation, and the other labeled with a channel number and W would handle a westbound transmission of it. This termination is indicated as located at a central station 18, which, in the example, may coincide with the location of COU 8. The terminal pairs are available for testing of a communications channel by the looping back of ends of these cable pairs at selected points along a route coinciding with repeater station locations.

A test person desiring to test a section of cable may, as indicated above, be located anywhere which is accessible by a touch-tone telephone 22. A test procedure would be initiated by a call placed by a telephone 22 to COU 8. Thus, in a standard manner, there would be a ring voltage on line 25 of 70 to 130 volts at 16 to 60 Hz. This voltage is then impressed across capacitor 24, resistor 26, through resistor 27, and then across oppositely poled diodes 28 and 30 of optical coupler 32. The resulting light emitted from the diodes operates phototransistor 34 on, which is conventionally biased from +12 volts terminal 38 through resistors 26 and 44 to its collector. The base of phototransistor 34 is conventionally connected to ground through resistor 33. The effect of this is to cause the voltage at point 45, coupled to the collector of phototransistor 34 through resistor 44, to fall to near zero when ringing voltage is present. A capacitor 42 is connected across the resistors and between terminal 38 and point 45, this acting as a filter and time delay, preventing various transient voltages appearing on line 25 from accidentally pulling voltage on point 45 downward. Thus, in effect, only a ring voltage will pull the voltage on point 45 down, which is a control operation of the system. Ring voltage must be present for at least the RC time constant developed by capacitor 42 and resistors 26 and 44. This allows the unit to "see" a normal "wink" but ignore noise spikes.

In addition to the ring voltage, as a standard arrangement with telephone systems, a D.C. voltage, approximately 48 volts, is continuously applied by the telephone exchange to a receiving circuit, and thus there would appear across the tip and ring conductors of line 25 D.C. voltage polarized as indicated. The present circuit operates to initially close this direct current circuit responsive to the ring voltage, and then, by virtue of other circuitry, to thus hold a closed circuit for control purposes with telephone exchange 23 by utilizing the applied direct current. In order to always maintain a polarity arrangement compatible with the circuitry of this system, bridge rectifier 39 is connected between incoming line 25 and other circuitry. Thus, in the event that the input telephone line should be reversed, the bridge rectifier would overcome this and maintain the polarities as shown.

The detection of ring voltage occurs by sensing the dropping of voltage on point 45 responsive to the conduction of phototransistor 34. This causes the voltage to drop at the input of Schmidt trigger 50, and, as a result, its output goes high. This output is applied through resistor 52 to the base input of NPN transistor 54, turning it on. Transistor 54 is powered through L.E.D. 56 of optical coupler 58 from plus bias terminal 38. The light output of L.E.D. 56 operates phototransistor 60 on, which completes a low impedance circuit through resistor 62, the base-emitter input of transistor 64, L.E.D. 66 of optical coupler 68, resistor 70, and indicating L.E.D. 72. This circuit is biased by the indicated power output of bridge rectifier 39, the negative terminal of which connects to the base-emitter circuit of phototransistor 60 through resistor 61 and collector of transistor 64. By this circuit, L.E.D. 66 turns phototransistor 69 on (its base being conventionally grounded through resistor 71); and as the collector of this circuit is connected to point 45, it parallels phototransistor 34, and thus holds points 45 low after a ring voltage is removed. This maintains the circuit in the posture just described wherein there is a closed D.C. circuit between COU 8 and telephone exchange 23 and thus a signal circuit with telephone 22.

The test person using telephone 22 is now informed of the connection by the generation in COU 8 of a distinctive dial tone, which is accomplished as follows. First, the transition to a low state at point 45 is applied to the input of Schmidt trigger 80, causing its output to go high, which, through inverter 114, places a low state on the reset input of flip-flop 100, whereby its $\overline{Q}$ output is high, which is fed to NAND gates 84 and 112. At the same time, the output of Schmidt trigger 80, at point 82, is coupled to a second input of NAND gate 84. With its two high inputs, its output goes low. This output is inverted by inverter 86 and is applied to an enabling input of NAND gate 88. Two separate tone signals of 438 Hz and 27 Hz are applied to the other two inputs of NAND gate 88, and when enabled, as described, this gate effects a mixing of these signals to provide at its output a 438 Hz tone signal modulated by 27 Hz. The two tones are obtained by oscillator 90 and dividers 92 and 94, a 3.59 MHz output of oscillator 90, being divided by divider 92 to obtain the 438 Hz signal, and this signal being divided by divider 94 to provide the 27 Hz signal.

The modulated tone output of NAND gate 88 is amplified by amplifier 96 and applied as an input signal to NPN transistor amplifier 98. The amplifier output of transister 98 appears across collector resistor 100, connected to plus bias terminal 38, and the output, a distinctive dial tone, is connected through capacitor 99 to signal line 97 which is connected across the secondary 102 of transformer 104. In this manner the dial tone is coupled through transformer 104 across the primary 106 of this transformer. It is then coupled through capacitor 107 across resistor 70 and modulates the D.C. signal coupled to telephone exchange 23. In this manner, the COU dial tone is coupled back to telephone 22.

Upon hearing the distinctive dial tone, the test person is signalled that he may proceed to effect a looping back of a discrete communications channel lying along a selected route and from a selected repeater station. His first step is one of route selection; and, for purposes of illustration, it is assumed that the route to be selected is a route designated 10. Accordingly, the test person would press button * (FIG. 1a) on touch-tone telphone 22. Electrically, this results in a conventional two-tone signal represenitive of the numeral 1 followed by the two-tone signal represenitive of the numeral 0. These are transmitted through transformer 104 and are receiver by tone separator 109, which, for example, might be a type MT 8865 integrated circuit. Tone separator 109 separates each of the two-tone frequencies into high (HT) and low (LT) signal components and supplies these to tone detector 108, which is actually a tone-to-digital converter (e.g., a type 8860). It provides a four-bit binary digital output signal, in this case, indicative of 10. This binary output of tone detector 108 is connected to the input of digital register 110 together with a strobe signal supplied through NAND gate 112 and inverter 113 to digital register 110. A high state from the $\overline{Q}$ output of flip-flop 100 enables NAND gate 112 to provide a low output which is inverted high by inverter 113. Under the signal conditions described, a "10" is strobed into register 110. The register output is fed to decoder 120 which renders a high state on a discrete output line 122, this line being a "10" line selection output for decoder 120. Ouput line 122 connects as an input to a route switching circuit 124a which operates to effect the coupling between the signal line 97 and the dedicated route line, in this case, route line 10. Each of the route control circuits 124, there being one for each route line, are alike, and three of them are indicated as a control circuits 124a, 124b, and 124c. Only control circuit 124a is illustrated in detail. As shown, it employs a line transformer 130 with its primary 131 connected through relay contacts 132 of relay 133 to signal line 97. The secondary 150 is connected to route line 10. Coil 137 of relay 133 is powered by transistor 136, connected through L.E.D. 140 to plus bias terminal 38. Transistor 136 is operated by a connection from output line 122 of decoder 120 through resistor 138 to its base. With line 122 high, transistor 136 is operated on, closing contacts 132 and coupling route line 10 to signal line 97 and thus back to telephone 22.

Each circuit 124 also provides D.C. operating power for the operation of loop-around control circuits (RLUs) at repeaters along a route. Such is provided by constant current generator circuit 144, in turn powered between −48 volt terminal 141 and ground. Current control is effected by PNP transistor 151 which is connected in series with the source and secondary windings 152 and 154 of secondary winding 150 of transformer 130. Current regulation is effected by 3.9 volt zener diode 145 connected between terminal 146 and the base of transistor 151 and across the emitter of transistor 151 through resistor 155. The power input to windings 152 and 154 is filtered by capacitor 153. By the circuit connections shown between power circuit 144 and the two secondary windings 152 and 154, the D.C. power and signal currents are compatibly combined.

Concurrent with the route selection process, actually with and upon the occurrence of a strobe pulse from tone detector 108, and applied through NAND gate 112 to flip-flop 100, the $\overline{Q}$ output of flip-flop 100 goes low, and there is provided a disabling level state back to NAND gate 112 which prevents any further strobe pulse from reaching register 110. In this manner, no further digitally representing tone signals on line 100 will reach register 110, assuring the maintenance of the selection until the loop around process is completed and COU 8 completes its operation for this test.

The test operator is signalled that the route selection has been completed by the termination of the COU generated tone signal. This is effected by applying the now low $\overline{Q}$ output of flip-flop 100 to NAND gate 84. The output of NAND gate 84 then goes high, and, accordingly, the output of inverter 86, applied to NAND gate 88, goes low, and, as a result, the output of NAND gate 88 is such that the tone signal applied back to line 97 is cut off.

Figure 2:
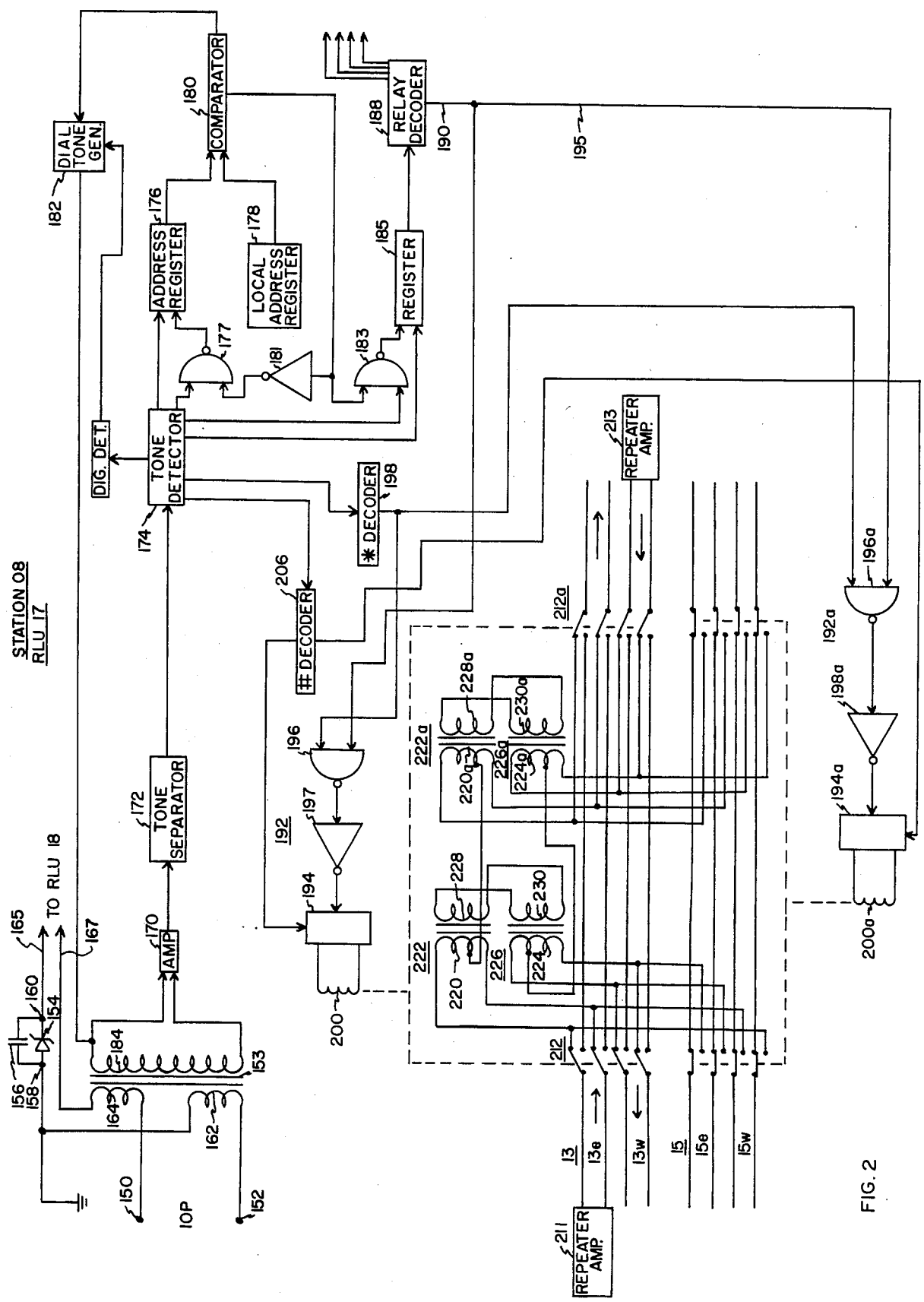
FIG. 2 is an electrical block diagram of a remote loop around unit (RLU) employed in conjunction with the central office unit to effect loop-around control at a repeater station.

The next step is for the test operator to select the repeater station lying along route 10 at which he desires to effect the looping back of a discrete communications channel. The dedicated line 10, for example, is connected to each of the RLU units of repeater stations along route 10. One of such repeater stations, station 08, is illustrated in FIG. 2. Power for operation of the RLU of it is obtained and extracted across 5.6 volt zener diode 154 and capacitor 156, and it appears at terminals 158 and 160. This circuitry is placed in series with primary transformer windings 162 and 164. These windings are fed from input terminals 150 and 152, in turn fed by control input line 10P connecting from an earlier, in line, repeater and ultimately back to control line 10. They terminate at output terminals 165 and 167 which connect to a like transformer of the next RLU in line, in this case, indicated as RLU We will now assume that the operator desires to effect the looping back of a communications channel at RLU 17 repeater station 08, illustrated in FIG. 2, and the eighth along route 10. As further illustrative of the process involved, FIG. 2 illustrates the two communications channels 13 and 15 indicating as originating at central office 18 shown in FIG. 1.

In keeping with our illustration, which would be to select RLU 17 at that repeater station, the user simply dials this number. This results in a two-tone signal for a 1 and then for a 7 being impressed on line 10 and thus to appear at all RLU's along route 10. At each one, the two sequential signals are fed from transformer 153, amplified by amplifier 170, and fed to tone separator 172. Tone separator 172 then sequentially separates the two sets of tones and feeds them to tone detector 174 which then generates binary outputs representative to the number 17. This digital output is fed to and is temporarily stored in address register 176. This register entry is executed by a strobe pulse through NAND gate 177 to register 176, in turn enabled by the then (no compare state) output of comparator 180 as applied through inverter 181.

Previously, local address register 178 of RLU 17 at station 08 has been preset to its address 17 by the entry of the number "17." The outputs of registers 176 and 178 of this RLU, the one shown, are compared in digital comparator 180 which then provides a turn-on signal to dial tone generator 182. It responds by generating a distinctive tone, for example, 440 Hz modulated by 10 Hz. This signal is applied back to the secondary 184 of transformer 153 and thereby back through the primary of this transformer onto cable pair 10P back to the user through like transformers in preceding RLU's to central office unit 8 and back through telephone exchange 23 to telephone 22. At the same time, comparator 180 applies a disabling signal to NAND gate 177 which blocks any further strobe pulse from tone detector 174 to address register 176 and applies a signal to NAND gate 183 which enables a strobe line from tone detector 174 to channel number register 185.

On hearing this new dial tone, the test operator is informed that his selected RLU has been contacted and that it is standing by to receive an instruction as to a particular communications channel to be tested. The test operator then dials a three-digit number on telephone 22 indicative of the communications channel, and this is transmitted through COU 8 and control line 10 and its extensions to RLU 08. There the tones representative of three dialed digits, we will assume 013 for channel 13, are separated by tone separator 172 and then converted into digits by tone detector 174. At this time, by virtue of the enabling of gate 183, passing a strobe pulse from tone detector 174 to register 185, the newly dialed digits are strobed into register 185. Outputs of register 185 are fed to relay decoder 188 which has an output line for each possible number in register 185 which, for example, would go high when its related number appears in register 185. Thus, in the present case, with a 013 digit in register 185, it is assumed that line 190 goes high. Line 190 is connected to relay switching circuit 192 which powers latching relay 194 to effect loop around switching between input and output pairs 13E and 13W of channel 013. Switching circuit 192 employs NAND gate 196 which has a first input connected to line 190 and a second input connected to the output of * decoder 198.

Asterisk decoder 198 is solely responsive to the dialing of an asterisk and a discrete signal representative of it from tone detector 174, and when such is sensed, decoder 198 provides a high output. Thus, NAND gate 196 switches to provide a low output when relay 013 is selected and the operator follows this by the dialing of an asterisk as an execute signal. This low output is inverted to a high output, 5 volts, by inverter 198 and fed to latching relay 194 which will set the relay by powering its coil 200. Additionally, latching relay 194 has a reset input connected to the output of decoder 206, decoder 206 being solely responsive to a # output of tone detector 174. Latching relay 194 is set or reset upon receipt of 4 to 8 millisecond pulses applied to an appropriate one of its inputs.

In operation, with a high state output of line 190 indicating that a 013 digit exists in register 185, and this being followed by the dialing of an *, coil 200 of latching relay 194 would be energized from the output of inverted 198 through NAND gate 196. This would cause contacts 212 and 212a to be moved from a lower position to an upper position (shown) whereupon the normal transmission of channel 103 through RLU 17 is interrupted. Instead, two looping back circuits are effected, one back toward the preceding RLU's and one toward the succeeding RLU's In the first instance, eastbound line 13E, after amplification by repeater amplifier 211, is connected through contacts 212 to primary winding 220 of loop around transformer 222, and a westbound line 13W is connected through contacts 212 to winding 224 of transformer 226. Secondary windings 228 and 230 of transformers 222 and 226 are connected together. This thus effects an actual coupling between input and output lines 13E and 13W and thereby the looping back of signals, to the left, back to their like designated terminals at station 18 shown in FIG. 1, or to any repeater station intermediate between repeater station 08 and a central office. At the same time, contacts 212a are similarly operated and westbound line 13W, at the output of repeater amplifier 213, is connected through like coupled transformers 222a and 226a to the eastbound line. Testing would be effected by conventional means, for example, by applying a test signal to one pair and listening to or for it on the other pair. The center taps of transformers 222 and 222a are connected together to maintain one polarity of normal D.C. bias along the eastbound cable pair, and center taps of transformers 226 and 226a are connected to maintain an opposite polarity bias on the westbound cable pair.

Thus, complete looping back is achieved in both directions from RLU 17 enabling, of course, testing to be done in all lines in both directions coupled to RLU 17.

At the conclusion of the tests, the test operator would simply dial a # symbol, and the tone combination for this symbol would be converted from a tone to a # representative digital output by tone detector 174, and this would be sensed by # decoder 206 which would then provide a momentary reset signal to latching relay 194 which would thereupon switch contacts 212 and 212a to their lower position whereupon transformers 222, 222a, 226, and 226a are removed from the circuit, and the wire pairs 13E and 13W of channel 13 are reconnected to effect communications directly to amplifier circuitry of repeater unit 08 for amplification and retransmission in a normal manner.

The control circuitry 193 and 193a for second communications channel 15 is the same as that shown for channel 13, with like numbers but with an "a" suffix, and looping back of channel 15 would be effected in the same manner, upon there appearing in register a "015." This would effect a "high" output on a second output line 195 of decoder 188 and effect coupling of cable pairs 15E and 15W together through transformers 222, 226, 222a, and 226a. The same circuitry and operation would exist for all other channels of RLU 17 and for all other RLUs.

From the foregoing, it is to be appreciated that the applicant has provided a most effective and versatile control system for controlling the testing of telephone lines.

What is claimed is:

1. A loop-around control system for remotely effecting interconnection of outbound and inbound cable pairs of a communications channel at a discrete location and in both directions from said discrete location along a discrete communications route, comprising:
   a central unit comprising:
      first signal means coupled to a telephone and responsive to a ring voltage for providing a first discrete electrical signal condition,
      second signal means responsive to said discrete signal condition for effecting A.C. and D.C. coupling to said telephone and maintaining such coupling,
      third signal means responsive to said discrete signal condition for applying, through said second signal means, a selected dial tone signal to said telephone,
      first tone-to-digital conversion means coupled to said second signal means for converting an incoming digital representative tone signal into a digital signal,
      fourth signal means responsive to appearance of said incoming tone signal for interrupting said dial tone signal,
      a plurality of discrete route signal control lines, and
      fifth signal means responsive to a said digital signal of said first tone-to-digital conversion means for coupling a selected one of said discrete route signal control lines through said second signal means to said telephone; and
   a plurality of remotely located loop around control systems positioned along and coupled to a said discrete signal control line at a discrete location, and each comprising:
      a local address register holding a digitally encoded discrete location address,
      second tone-to-digital conversion means responsive to a digitally encoded tone on said signal control line for providing as an output, a binary encoded identification signal,
      signal register means for temporarily storing an identification signal output of said second tone-to-digital conversion means, comparator means responsive to an output of said local address register, and a discrete address identification signal from said signal register means, for providing a signal output when outputs of said registers are identical, sixth signal means responsive to a said signal output of said comparator means for generating a second discrete dial tone and coupling said second discrete dial tone to a said signal control line, seventh signal means comprising:

channel identification means responsive to the occurrence of a signal output of said comparator means and the occurrence on a said discrete signal control line of a channel identification tone signal from said telephone for storing in said signal register means a channel identification signal, first repeater amplification means having a first input connected to the output of an inbound first cable pair entering a said discrete location from a first direction and having a first output, and second repeater amplification means having a second input connected to the output of an inbound second cable pair entering said discrete location from an opposite direction and having a second output, first transformer means including first and second windings magnetically coupled, second transformer means including third and fourth windings magnetically coupled, first connection means for interconnecting A.C. neutral points on said first and third windings and second connection means for interconnecting A.C. neutral points on said second and fourth windings, and switching means responsive to a said channel identification signal in said channel identification means for interconnecting the said output of said first repeater amplification means through said first and second windings of said first transformer means to a first outbound cable pair accompanying said inbound first cable pair and for interconnecting the output of said second repeater amplification means through said third and fourth windings of said second transformer means to a second outbound cable pair accompanying said inbound second cable pair;

whereby, under the remote control of a telephone connected to said telephone unit, incoming communications on cable pairs at a said discrete location are coupled in the reverse direction and thereby loop-around test circuits effected.

2. A system as set forth in claim 1 wherein said switching means further includes eighth signal means responsive to a selected second tone signal, an execution signal, appearing on a said control line, subsequent to appearance of said channel identification signal, for effecting the execution of said interconnection of windings.

3. A system as set forth in claim 2 wherein said switching means further includes ninth signal means responsive to a third selected tone signal, a termination signal, appearing on a said control line for disabling said interconnection of said outputs of said repeater amplification means.

4. A system as set forth in claim 3 wherein said fifth signal means includes a transformer coupled to each discrete signal control line and includes means responsive to a particular said digital output of said first tone-to-digital conversion means for connecting a particular said transformer to said telephone.

5. A system as set forth in claim 4 wherein said central control unit includes power supply means coupled through said transformer to a said control line whereby a said remotely located loop-around control system is coupled to a said control line and is powered.

6. A system as set forth in claim 5 wherein said switching means includes latching relay means, in turn including a latching relay having coil and latching contacts, and said coil being coupled through said latching contacts to said eighth signal means, and said ninth signal means includes means responsive to the momentary occurrence of a said third selected tone signal for interrupting power to said latching contacts and disabling said switch means, and thereby closing a first circuit from said first output of said first repeater amplification means to said second outbound cable pair and from said second output of said second repeater amplification means to said first outbound cable pair.

* * * * *